United States Patent
Tamura

(10) Patent No.: US 10,418,881 B2
(45) Date of Patent: Sep. 17, 2019

(54) ROTARY ELECTRIC MACHINE FOR VEHICLE

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/020,753

(22) Filed: Sep. 6, 2013

(65) Prior Publication Data

US 2014/0070639 A1    Mar. 13, 2014

(30) Foreign Application Priority Data

Sep. 7, 2012  (JP) .................................. 2012-197487

(51) Int. Cl.
  *H02K 9/00*   (2006.01)
  *H02K 3/24*   (2006.01)
  *H02K 9/19*   (2006.01)

(52) U.S. Cl.
  CPC .................. *H02K 9/00* (2013.01); *H02K 3/24* (2013.01); *H02K 9/19* (2013.01)

(58) Field of Classification Search
  CPC .. H02K 9/00; H02K 9/19; H02K 3/00; H02K 3/04; H02K 3/12
  USPC .............. 310/52, 54, 58, 179, 198, 202, 201
  See application file for complete search history.

(56) References Cited

U.S. PATENT DOCUMENTS

| | | | | |
|---|---|---|---|---|
| 5,519,269 A | * | 5/1996 | Lindberg | H02K 9/19 310/58 |
| 6,486,586 B2 | * | 11/2002 | Higashino | H02K 9/06 310/260 |
| 6,933,652 B2 | * | 8/2005 | Higashino | H02K 3/38 310/201 |
| 2003/0132679 A1 | | 7/2003 | Kato | |

(Continued)

FOREIGN PATENT DOCUMENTS

| | | |
|---|---|---|
| JP | 2003-259585 | 9/2003 |
| JP | 2005-012961 | 1/2005 |

(Continued)

OTHER PUBLICATIONS

Machine translation of JP 2007104783 A.*

(Continued)

*Primary Examiner* — Quyen P Leung
*Assistant Examiner* — Minki Chang
(74) *Attorney, Agent, or Firm* — Nixon & Vanderhye P.C.

(57) ABSTRACT

A rotary electric machine includes a rotor, a stator disposed facing the rotor in a radial direction having a stator core with a plurality of slots aligned in a circumferential direction and a stator winding wound around the slots of the stator core, and a cooling mechanism for cooling first and second coil-end groups of the stator winding by dropping a liquid coolant from an outer peripheral side thereof. The stator is disposed along an inner circumferential surface of at least one of the first and the second coil-end groups of the stator winding, and there is provided a shielding member for preventing the liquid coolant from falling into the inner circumferential side of the first and the second coil-end groups. Thus, it is possible to cool throughout the first and the second coil-end groups efficiently and reliably by the liquid coolant, a sufficient cooling effect can be obtained.

5 Claims, 12 Drawing Sheets

(56) References Cited

U.S. PATENT DOCUMENTS

| | | | |
|---|---|---|---|
| 2003/0214196 A1* | 11/2003 | Cai | H02K 3/12 310/208 |
| 2004/0061401 A1* | 4/2004 | Gorohata | H02K 3/12 310/208 |
| 2007/0018525 A1* | 1/2007 | Cai | H02K 3/28 310/184 |
| 2007/0200449 A1* | 8/2007 | Hayashi | H02K 3/12 310/180 |
| 2010/0251796 A1* | 10/2010 | Akimoto | H02K 15/0421 72/375 |
| 2011/0175483 A1* | 7/2011 | Koike | H02K 3/12 310/201 |
| 2011/0316367 A1* | 12/2011 | Takahashi | H02K 9/19 310/54 |
| 2012/0038230 A1* | 2/2012 | Kurahara et al. | 310/71 |
| 2012/0062056 A1 | 3/2012 | Bradfield | |
| 2012/0161555 A1* | 6/2012 | Sawada | H02K 3/24 310/54 |
| 2012/0161569 A1* | 6/2012 | Hisada | H02K 3/28 310/201 |
| 2013/0076175 A1* | 3/2013 | Turnbull | H02K 3/50 310/71 |
| 2014/0097713 A1* | 4/2014 | Puiu et al. | 310/54 |

FOREIGN PATENT DOCUMENTS

| | | |
|---|---|---|
| JP | 2007-104783 | 4/2007 |
| JP | 2007104783 A * | 4/2007 |
| JP | 2009-284718 | 12/2009 |
| JP | 2011-035992 | 2/2011 |
| JP | 2012-090517 | 5/2012 |

OTHER PUBLICATIONS

Sep. 29, 2015 Notification of Reasons for Rejection issued in Japanese Patent Application No. 2012-197487 (with English-language translation).

* cited by examiner

COMPARATIVE EXAMPLE

ROTARY ELECTRIC MACHINE FOR VEHICLE

CROSS-REFERENCE TO RELATED APPLICATION

The application is based on and claims the benefit of priority from earlier Japanese Patent Application No. 2012-197487 filed Sep. 7, 2012, the description of which is incorporated herein by reference.

TECHNICAL FIELD

The present disclosure relates to a rotary electric machine used as a generator or a motor mounted on, for example, vehicles.

BACKGROUND

Conventionally, a rotary electric machine used as a generator or a motor in vehicles has a rotor and a stator disposed facing the rotor in a radial direction.

The stator has a stator core with a plurality of slots aligned in a circumferential direction, and a stator winding wound around the slots of the stator core.

In this rotary electric machine, when an electric current flows through the stator winding, the stator winding and the stator core generate heat.

When the heat is generated in this way, a magnetic flux generated in the rotary electric machine is affected, and reduces an operating efficiency of the rotary electric machine.

Therefore, in order to maintain a high operational efficiency, it is necessary to cool the rotating electric machine, and a rotating electric machine having a cooling structure is proposed in Japanese Patent Application Laid-Open Publication No. 2005-12961, for example.

On the assumption that the rotating electric machine is mounted in a vehicle so that its axial direction becomes horizontal, a groove extending in a circumferential direction to induce a coolant is formed on a circumferential surface of a coil-end of the stator winding that projects from the stator core to both sides in the axial direction in the cooling structure disclosed in the Publication '961.

In this case, by dropping a coolant such as oil to the coil-end of the rotating electric machine that is mounted horizontally, the coolant is adapted to flow along the circumferential surface of the coil-end.

By the way, a segment-type stator winding formed by connecting a plurality of U-shaped conductor segments, for example, as the stator winding is known.

In the stator winding of this kind, conductor wires of the coil-end become interlaced, and thus relatively large gaps are formed between the conductor wires.

Therefore, when this kind of the stator winding is employed, the coolant such as the oil or the like would fall in a vertical direction from the gaps between the conductor wires even when the groove is formed on the circumferential surface of the coil-end as disclosed in the Publication '961 above, it is impossible to obtain a sufficient cooling effect.

As a result, there is a possibility that an insulating film covering the surface of the stator winding is melted, causing insulation failure.

SUMMARY

An embodiment provides a rotary electric machine that is capable of securing a sufficient cooling effect by a dropping of liquid coolant.

In a rotary electric machine according to a first aspect, the rotary electric machine includes a rotor, a stator disposed facing the rotor in a radial direction having a stator core with a plurality of slots aligned in a circumferential direction and a stator winding wound around the slots of the stator core, and a cooling mechanism for cooling a plurality of coil-end groups of the stator winding by dropping a liquid coolant from an outer peripheral side thereof.

The stator is disposed along an inner circumferential surface of at least one of the coil-end groups of the stator winding, and there is provided a shielding member for preventing the liquid coolant from falling into the inner circumferential side of the coil-end groups.

According to the present disclosure, the stator has the shielding member disposed along the inner circumferential surfaces of the coil-end groups of the stator winding.

Therefore, since the liquid coolant dropped to the coil-end groups is prevented from falling into the inner circumferential sides of the coil-end groups by the shielding member, the liquid coolant flows downwardly along the inside of the coil-end groups after entering inside the coil-end groups, and drops to the outside from lower ends of the outer circumferential surfaces of the coil-end groups.

Thereby, the whole coil-end groups are cooled efficiently and reliably by the liquid coolant that flows evenly inside the entire coil-end groups, thus sufficient cooling effect is obtained.

In the rotary electric machine according to a second aspect, the shielding member has a flange portion spreading outwardly in a radial direction from an outer end in an axial direction of the shielding member.

In the rotary electric machine according to a third aspect, the shielding member is adhered to the coil-end groups using an adhesive agent.

In the rotary electric machine according to a fourth aspect, the shielding member is formed in an annular shape.

In the rotary electric machine according to a fifth aspect, an outer diameter of the shielding member is configured larger than an inner diameter of the coil-end groups.

In the rotary electric machine according to a sixth aspect, the shielding member is formed in a semicircular arc, and is attached to the coil-end group so that a central portion in a circumferential direction thereof is positioned where the liquid coolant is dropped.

In the rotary electric machine according to a seventh aspect, at least a surface portion of an outer peripheral side of the shielding member is formed of a resin material of a similar linear expansion coefficient to an insulating film of a conductor wire that compose the stator winding.

In the rotary electric machine according to an eighth aspect, the stator winding has a straight portion extending in the axial direction accommodated in the slots of the stator core, and the straight portion is projected by a predetermined length from an end surface of the stator core.

DETAILED DESCRIPTION OF THE PREFERRED EMBODIMENTS

Hereinafter, embodiments of a rotating electric machine according to the present disclosure will be described in detail with reference to the drawings.

First Embodiment

A rotating electric machine 1 of the present embodiment is intended to be used as a vehicle motor.

Figure 1:
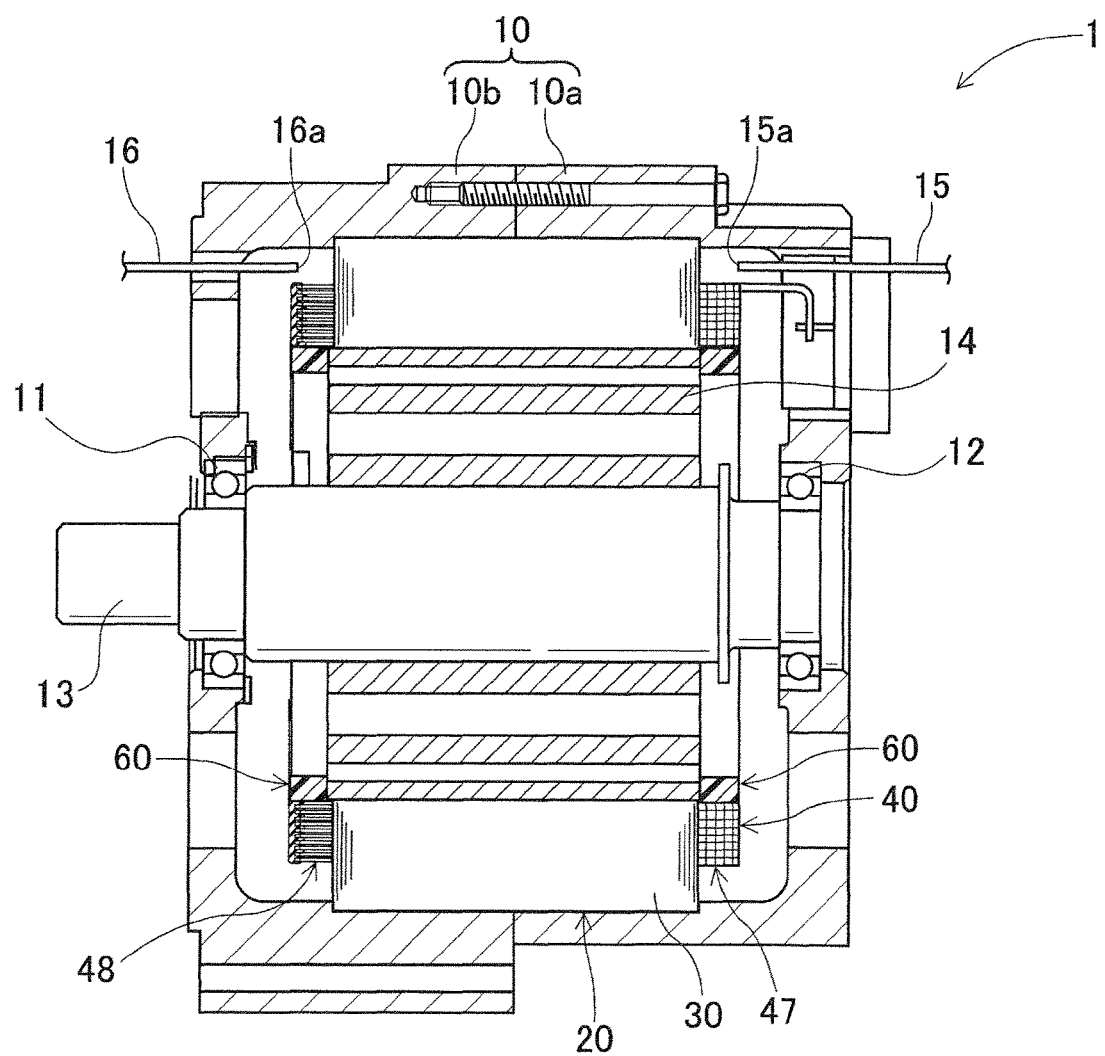
FIG. 1 shows a cross-sectional view of a rotating electric machine taken along an axial direction according to a first embodiment.

As shown in FIG. 1, the rotating electric machine 1 has a housing 10, a rotor 14, and a stator 20. The housing 10 is composed of a pair of substantially bottomed cylindrical housing members 10a and 10b openings thereof are joined. The rotor 14 is fixed to the rotary shaft 13 that is rotatably supported by the housing 10 through bearings 11 and 12. The stator 20 is fixed to the housing 10 at a position surrounding the rotor 14 disposed in the housing 10.

In addition, a coolant supplying system including a pair of conduits 15 and 16 for supplying a liquid coolant for cooling a stator winding 40 of the stator 20 is provided to the rotary electric machine 1.

The conduits 15 and 16 are attached to the housing 10 in a state of penetrating through each housing member 10a and 10b so as to communicate inside and outside of the housing 10.

Discharge ports 15a and 16a for discharging the liquid coolant are provided to distal ends of the conduits 15 and 16, respectively.

The discharge ports 15a and 16a are opened vertically above of first and second coil-end groups 47 and 48, respectively, of the stator winding 40 accommodated in the housing 10.

Incidentally, this rotary electric machine 1 is provided with a recovery means (not shown) that recovers and circulates the liquid coolant discharged from the discharge ports 15a and 16a back to the coolant supplying system so as to discharge the liquid coolant again, and a cooler (not shown) for cooling the heated liquid coolant in a middle of a circulation path, and a cooling mechanism for cooling the stator winding 40 (stator 20) is configured by these devices.

Further, although an ATF (Automatic Transmission Fluid) is used as the liquid coolant in the present embodiment, a commonly known liquid coolant used in a conventional rotating electrical machine may be used.

The rotor 14 has a plurality of permanent magnets on an outer peripheral side that faces an inner peripheral side of the stator 20. The permanent magnets are spaced apart with a predetermined distance therebetween in a circumferential direction. A plurality of magnetic poles with different polarities alternately in the circumferential direction is formed by the permanent magnets.

The number of magnetic poles of the rotor 14 is not intended to be limited because it differs depending on a specification of the rotary electric machine 1. In the present embodiment, eight poles have been used for the rotor (N poles: 4, S-poles: 4).

Next, the stator 20 is explained with reference to FIG. 2 to FIG. 9.

Figure 2:
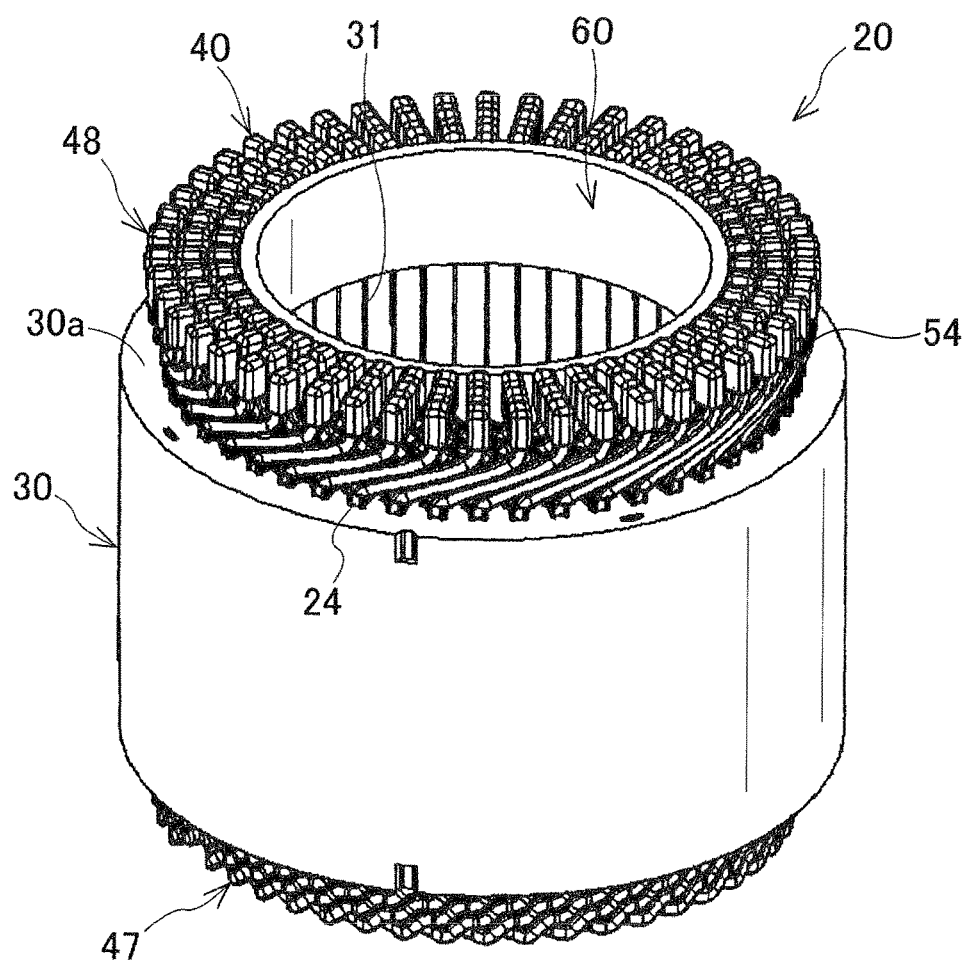
FIG. 2 shows a perspective view of a stator seen from a second coil-end group side in the first embodiment.

As shown in FIG. 2, the stator 20 has an annular stator core 30 and the stator winding 40. The stator core 30 has a plurality of slots 31 arranged in the circumferential direction. The three-phase stator winding 40 (U phase, V phase, W phase) is formed by winding a plurality of conductor segments (conductor wires) around the stator core 30. The conductor segments 50 are inserted in the slots 31, and ends thereof are connected to each other in one side in an axial direction of the stator core 30.

That is, the stator windings 40 of the present embodiment is of a segment type that the plurality of substantially U-shaped conductor segments 50 connected to a predetermined state by welding are wound around the stator core 30.

The stator core 30 is formed by stacking a plurality of electromagnetic steel plates in the axial direction.

The stator core 30 is composed by an annular back core portion 33 and a plurality to teeth 34. The teeth 34 are projecting inwardly in a radial direction from the back core section 33, and are arranged in the circumferential direction with a predetermined distance therebetween. Each slot 31 is formed between the adjoining teeth 34.

That is, the plurality of slots 31 is formed on an inner circumferential surface of the stator core 30 radially in the radial direction so as to accommodate the stator winding 40 therein. The slots 31 each having a substantially rectangular cross section that penetrates through the stator core 30 in the axial direction are arranged with a constant pitch therebetween in the circumferential direction.

A number of the slots 31 formed in the stator core 30 is configured to a rate of two per phase of the stator winding 40 relative to the number of the magnetic poles (8 poles) of the rotor 14.

In the present embodiment, the number of slots is configured to 48 from 8×3×2=48.

The stator winding 40 wound around the slots 31 of the stator core 30 is formed by joining the ends of open end sides of the substantially U-shaped conductor segments 50 together by welding.

Each of the conductor segments 50 is formed by bending a straight-angle conductor into a U shape. An outer circumferential surface of the straight-angle conductor is covered with an insulating film.

The insulating film can be formed by employing a polyimide resin (PI), polyamide-imide resin (PAI), polyphenylene sulfide resin (PPS), polyether ether ketone resin (PEEK) or the like.

Further, conductors in joint portions welded at both ends of the 50 conductor segments are exposed by peeled off the insulating film.

Figure 3:
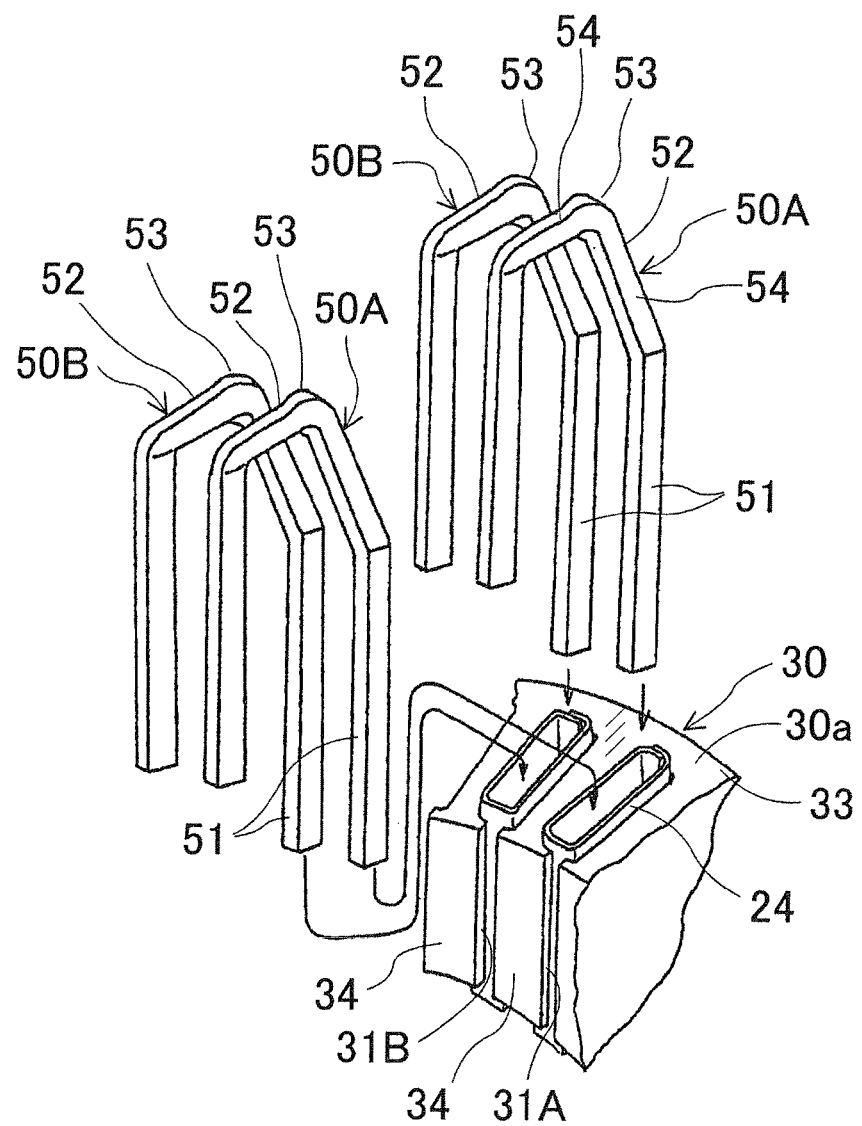
FIG. 3 shows a state where conductor segments are inserted in slots of a stator core in the first embodiment.

As shown in FIG. 3, the conductor segment 50 formed in the substantially U-shape is made of a pair of straight portions 51 parallel to each other and a turn portion 52 that connects first ends of the pair of straight portions 51.

A stepped top portion 53 extending along an end surface 30a of the stator core 30 is provided in a central portion of the turn portion 52. Inclined portions that incline at a predetermined angle with respect to the end surface 30a of the stator core 30 are provided to both sides of the stepped top portion 53.

In addition, a reference numeral 24 is given to an insulator for electrically insulating between the stator winding 40 and the stator core 30.

FIG. 3 shows a pair of the conductor segments 50A and 50B form by two pieces that are inserted into the adjoining slots 31A and 31B that have identical phase.

In this case, the pairs of straight portions 51 of the conductor segments 50A and 50B are not inserted into the same slot 31, but are inserted into the adjoining slots 31A and 31B separately from one axial end side of the slots 31.

That is, in the conductor segments 50A shown on the right side in FIG. 3, one straight portion 51 of one conductor segment 50A is inserted into an outermost layer (a sixth layer) of one slot 31A, and another straight portion 51 is inserted into a fifth layer of another slot (not shown) that is separated with one pole pitch (NS pole pitch) toward a counterclockwise direction of the stator core 30.

Then, one straight portion 51 of another conductor segment 50B is inserted into the outermost layer (a sixth layer) of slot 31B adjoining the slot 31A, and another straight portion 51 is inserted into a fifth layer of another slot (not shown) that is separated by one pole pitch (NS pole pitch) toward a counterclockwise direction of the stator core 30.

In other words, the two conductor segment 50A and 50B are arranged in a state shifted by one slot pitch in the circumferential direction.

In this way, the straight portions 51 of the even-numbered conductor segments 50 are inserted into all of the slots 31.

In the present embodiment, a total of six straight portions 51 are stacked radially in a row in each slot 31.

Open end portions of the pair of the straight portions 51 extending toward another axial end side of the slots 31 are twisted opposing each other in the circumferential direction so that the end portions are passed obliquely with a predetermined angle with respect to the end surface 30a of the stator core 30, and forms obliquely passing sections 54 (see FIG. 2) with the length of substantially a half pole pitch.

Figure 4:
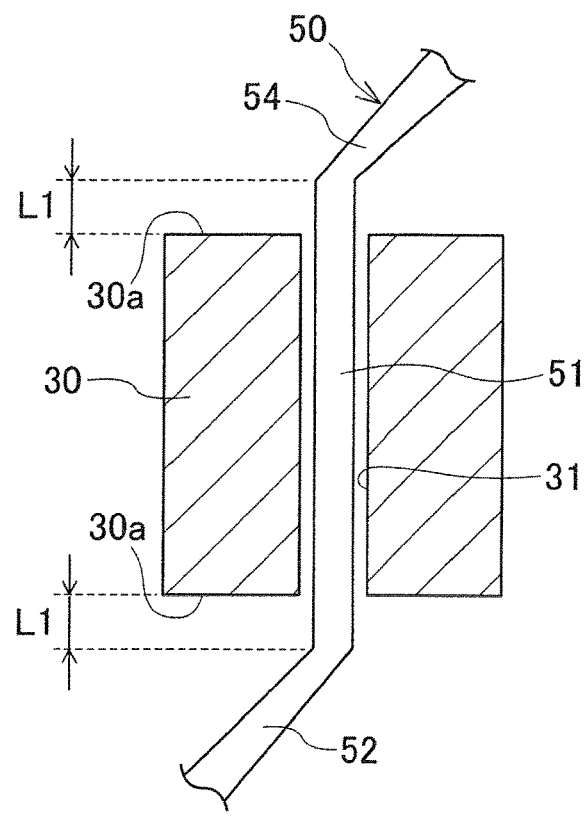
FIG. 4 shows a partial cross-sectional view of the stator in the first embodiment.

As shown in FIG. 4, the conductor segments 50 are inserted and arranged in each slot 31 in a state where the straight portions 51 are projected by a predetermined length L1 from the axial end surface 30a of the stator core 30.

Then, in another axial end side of the stator core 30, leading ends of the obliquely passing sections 54 of the predetermined conductor segments 50 are joined by welding and are electrically connected in a predetermined pattern.

That is, the predetermined conductor segments 50 are connected in series so that the stator winding 40 having three phase windings (U-phase, V-phase, W-phase) wound in wave winding in the circumferential direction along the slot 31 of the stator core 30 is formed.

For each phase of the stator winding 40, a winding (coil) that wound around the stator core 30 six laps is formed by a standard U-shaped conductor segment 50.

However, for each phase of the stator winding 40, a segment that has a neutral point for a leader line and an output line for a leader integrally, and a segment having a turn portion connected to a first lap, a second lap, a third lap, a fourth lap, a fifth lap, and a sixth lap is formed by a deformed segment different from the standard conductor segment 50 (not shown).

The winding ends of each phase of the stator winding 40 are connected by a star connection by using the deformed segments.

As shown in FIG. 2, a first coil-end groups 47 formed by stacking a plurality of turn portions 52 of the conductor segments 50 projecting from the end surface 30a of one end side of the stator core 30 in the radial direction of the stator core 30 is disposed in the one axial end of the stator winding 40 configured as above.

Further, a second coil-end group 48 formed by stacking a plurality of obliquely passing sections 54 of the conductor segments 50 projecting from the end surface 30a of the other end side of the stator core 30 and welded joint portions in the radial direction of the stator core 30 is disposed in the other axial end of the stator winding 40.

In addition, the conductor segments 50 constituting the first and the second coil-end groups 47 and 48 are in a meshed state, and gaps are formed between the conductor segments 50.

As shown in FIG. 1 and FIG. 2, a shielding member 60 is disposed inside the inner peripheral sides of the first and the second coil-end groups 47 and 48 of the stator winding 40. The shielding member 60 prevents the liquid coolant dropped respectively on the first and the second coil-end groups 47 and 48 from dropping into the inner circumferential side of the first and the second coil-end groups 47 and 48.

Figure 5:
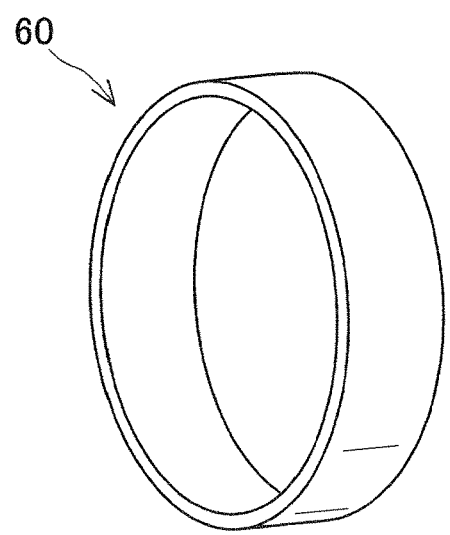
FIG. 5 shows a perspective view of a shielding member used in the first embodiment.

As shown in FIG. 5, the shielding member 60 is formed in an annular shape with a substantially constant thickness, and is disposed along the inner circumferential surfaces of the first and the second coil-end groups 47 and 48.

Figure 6A:
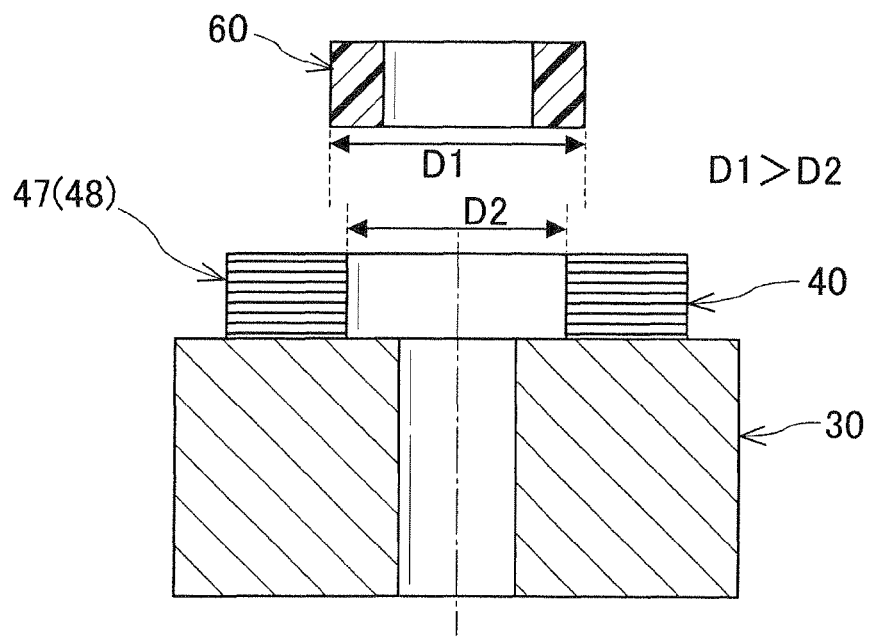
FIG. 6A shows an attached state of the shield member used in the first embodiment before press-fitting.
Figure 6B:
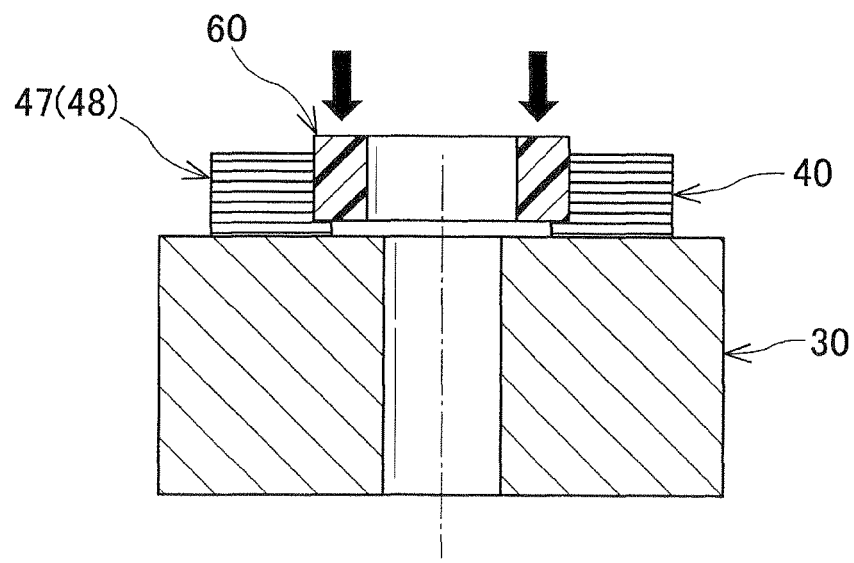
FIG. 6B shows an attached state of the shield member used in the first embodiment after press-fitting.

An outer diameter D1 of the shielding member 60 in the present embodiment, as shown in FIG. 6A, is configured larger than an inner diameter D2 of the first and the second coil-end groups 47 and 48, and as shown in FIG. 6B as, the shielding member 60 is attached to the inner peripheral sides of the first and the second coil-end groups 47 and 48 by press-fitting.

In order to prevent the press-fitted shielding member 60 from detaching from the first and the second coil-end groups 47 and 48, the shielding member 60 is adhered to the first and the second coil-end groups 47 and 48 by using an adhesive agent such as varnish (epoxy adhesive, polyester adhesive, etc.), for example.

The adhesive agent such as varnish may be coated before press-fitting the shielding member 60 into the inner peripheral sides of the first and the second coil-end groups 47 and 48.

In this way, damages to the insulating film of the conductor segments 50 that form the first and the second coil-end groups 47 and 48 when press-fitting the shielding member 60 can be prevented, thereby good insulation properties can be obtained.

Figure 7:
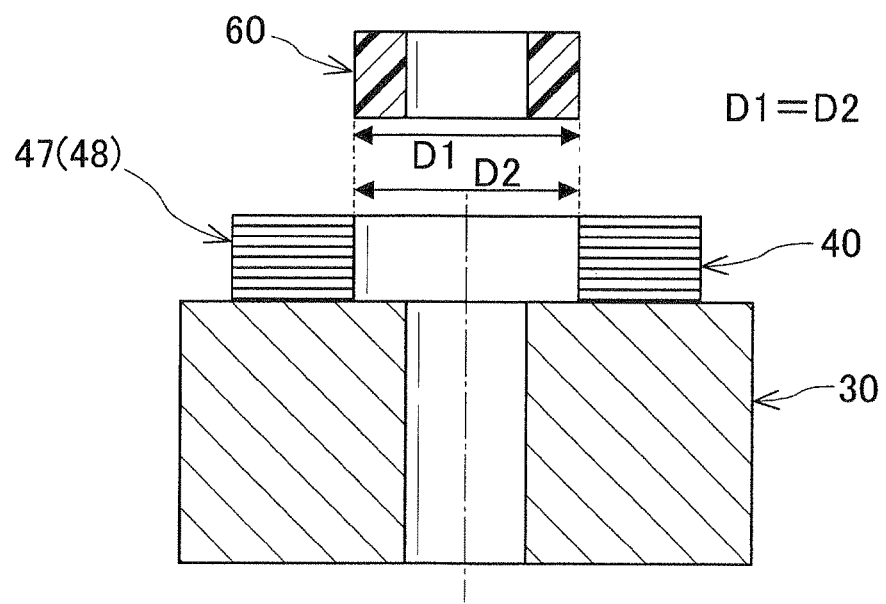
FIG. 7 shows an explanatory view of another attached state of the shielding member in the first embodiment.

Further, as shown in FIG. 7, the outer diameter D1 of the shielding member 60 and the inner diameter D2 of the first and the second coil-end groups 47 and 48 may be configured to be the same.

Figure 8A:
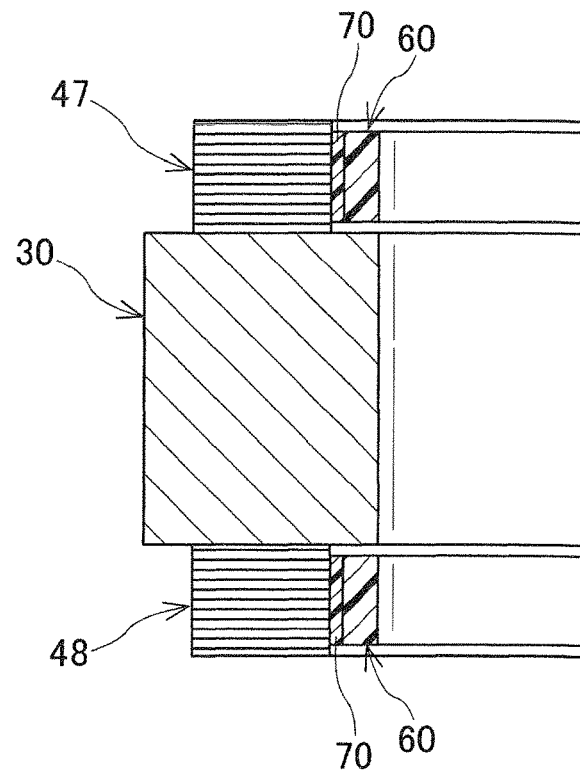
FIG. 8A shows a state of the shielding member being attached to the coil-end group in the first embodiment.

In such a case, the shielding member 60 may be adhered to the inner circumferential surfaces of the first and the second coil-end groups 47 and 48 by the adhesive agent 70, as shown in FIG. 8A.

Figure 8B:
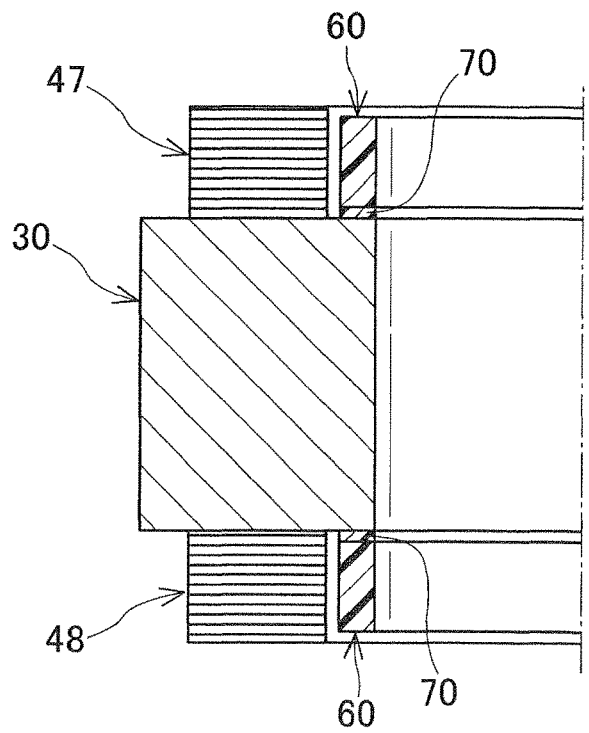
FIG. 8B shows a state of the shielding member being attached to the stator core in the first embodiment.

Alternatively, as shown in FIG. 8B, the shielding member 60 may be adhered against the end surface 30a of the stator core 30 by the adhesive agent 70.

The shielding member 60 is formed entirely by a resin material having a similar coefficient of linear expansion between the insulating films of the conductor segments 50 that compose the stator winding 40.

Thereby, since the linear expansion coefficient of the shielding member 60 and the insulating films of the conductor segment 50 are close, a gap will not be generated at contacting surfaces therebetween even when being expanded due to temperature rise, it becomes possible to prevent the reduction of the cooling effect due to leakage of the liquid coolant.

Next, functions of the rotary electric machine 1 of the present embodiment configured as above is explained.

In the rotating electric machine 1 of the present embodiment, the rotary shaft 13 rotates accompanied by the rotation of the rotor 14 when the operation is started by energizing the stator windings 40 of the stator 20, and the driving force is supplied to another device from the rotary shaft 13.

At the same time, by the coolant supply system, the liquid coolant is discharged towards the tops of the first and the second coil-end groups 47 and 48 from the discharge ports 15a and 16a of the conduits 15 and 16.

The liquid coolant discharged from the discharge ports 15a and 16a is supplied from above to the outer circumferential surfaces of the first and the second coil-end groups 47 and 48 of the stator winding 40.

Figure 9:
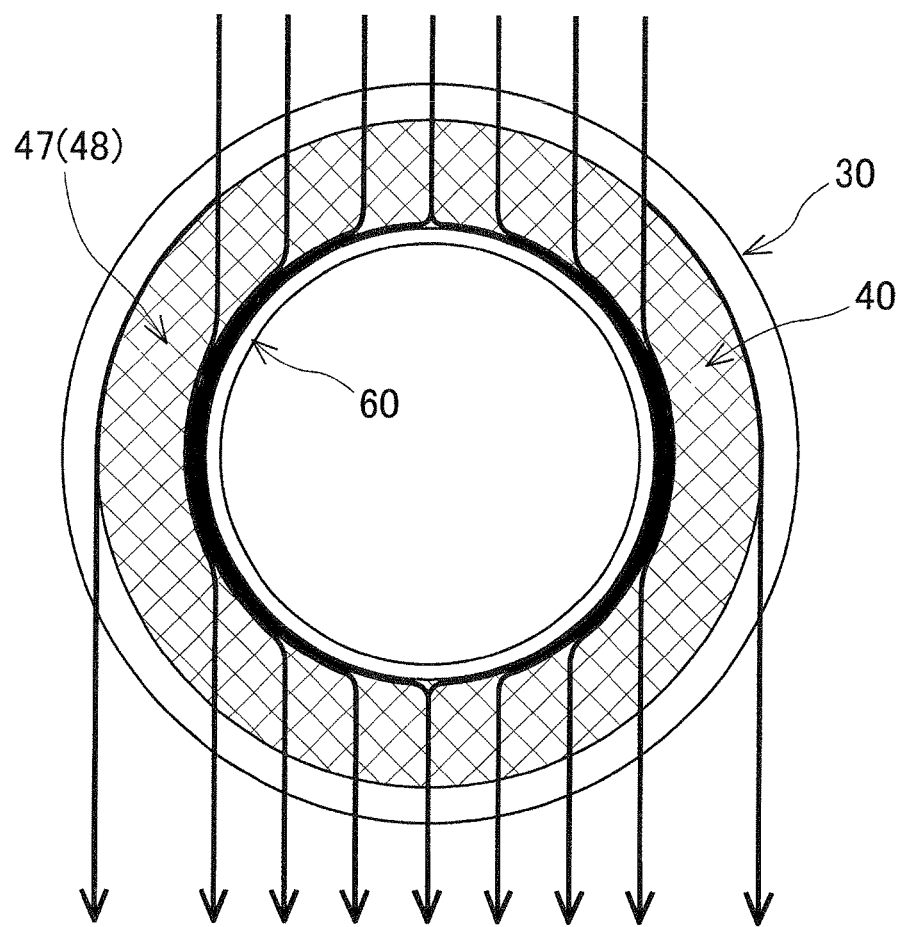
FIG. 9 shows an explanatory view of a state in which the liquid coolant dropped to the coil-end group flows in the first embodiment.

As shown in FIG. 9, the supplied liquid coolant (shown by arrows) enters into insides of the first and the second coil-end groups 47 and 48 and flows downwardly.

Then, when the liquid coolant reaches the inner circumferential surfaces of the first and the second coil-end groups 47 and 48, the liquid coolant will not fall into the inner circumferential sides of the first and the second coil-end groups 47 and 48 by the shielding member 60, but guided and distributed on both sides in the circumferential direction by the shielding member 60, the liquid coolant f lows downwardly and drops to the outside from lower ends of the outer circumferential surfaces of the first and the second coil-end groups 47 and 48.

Thereby, the whole first and second coil-end groups 47 and 48 are cooled efficiently and reliably by the liquid coolant that flows evenly inside the entire first and the second coil-end groups 47 and 48, thus sufficient cooling effect is obtained.

Figure 10:
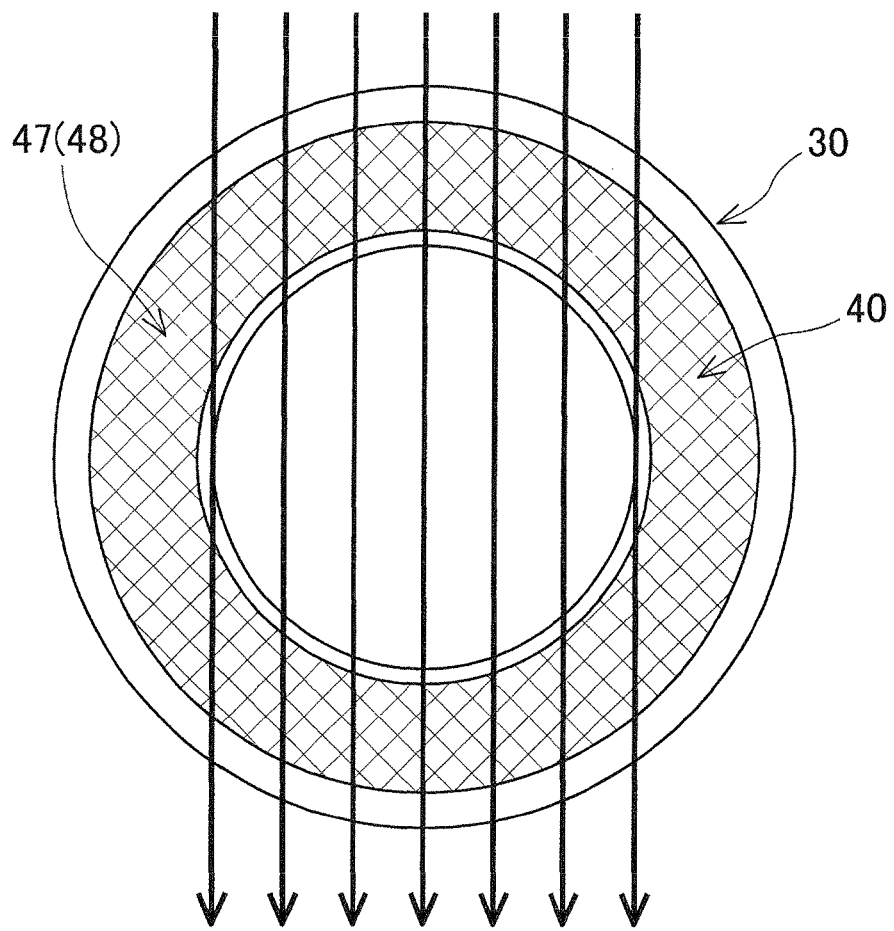
FIG. 10 shows an explanatory view of a state in which the liquid coolant dropped to the coil-end group flows in a comparative example.

It should be appreciated that in the case where the shielding member 60 is not disposed as in the comparative example shown in FIG. 10, the liquid coolant entering the first and the second coil-end groups 47 and 48 supplied to the tops of the first and the second coil-end groups 47 and 48 from the discharge port 15a and 16a of the conduit 15, 16 flows inside the first and the second coil-end groups 47 and 48 in the vertical direction, and drops to the outside from the lower ends of the outer circumferential surfaces of the first and the second coil-end groups 47 and 48.

That is, because the supplied liquid coolant drops to the outside from the lower ends without passing through both sides of the first and the second coil-end groups 47 and 48, it is impossible to obtain a sufficient cooling effect.

As described above, according to the rotary electric machine 1 of the present embodiment, since the stator 20 has the shielding member 60 disposed along the inner circumferential surfaces of the first and the second coil-end groups 47 and 48 of the stator winding 40, the liquid coolant dropped to the first and the second coil-end groups 47 and 48 is prevented from falling into the inner circumferential sides of the first and the second coil-end groups 47 and 48.

Thus, it is possible to cool throughout the first and the second coil-end groups 47 and 48 efficiently and reliably by the liquid coolant, and a sufficient cooling effect can be obtained.

Further, the shielding member 60 of the present embodiment is adhered to the first and the second coil-end groups 47 and 48 using the adhesive agent 70.

Thereby, since the gaps between the first and the second coil-end groups 47 and 48 and the shielding member 60 are filled with adhesive agent 70, it is possible to prevent the reduction of the cooling effect due to leakage of the liquid coolant.

Further, in the present embodiment, since the shielding member 60 is formed in the annular shape, it is possible to prevent the falling of the liquid coolant in the inner circumferential surface of the entire area of the first and the second coil-end groups 47 and 48.

Furthermore, the outer diameter D1 of the shielding member 60 of the present embodiment is configured to be larger than the inner diameter D2 of the first and the second coil-end groups 47 and 48.

Thereby, when the shielding member 60 is attached into the inner peripheral sides of the first and the second coil-end groups 47 and 48 by press-fitting, the first and the second coil-end groups 47 and 48 are compressed radially outwardly and clearances inside the first and the second coil-end groups 47 and 48 are reduced.

Therefore, the cooling effect is improved because the liquid coolant becomes accumulated inside the first and the second coil-end groups 47 and 48 by surface tension.

Further, the shielding member 60 is formed by the resin material having the similar coefficient of linear expansion between the insulating films of the conductor segments 50 that compose the stator winding 40.

Therefore, since the gap will not be generated at the contacting surfaces between the shielding member 60 and the conductor segments 50 even when being expanded due to temperature rise, it becomes possible to prevent the reduction of the cooling effect due to leakage of the liquid coolant.

Further, in the present embodiment, the straight portions 51 accommodated in the slots 31 of the conductor segments 50 that compose the stator winding 40 are projected by the predetermined length L1 from the end surfaces 30a of the stator core 30.

In such a case, since the gaps between the stator windings 40 and the stator core 30 are larger at the end surfaces 30a of the stator core 30, the liquid coolant is easily passed through, and a cooling performance is easily impaired.

Therefore, it is possible to exert the cooling effect more remarkably by providing the shielding member 60 of the present embodiment.

Second Embodiment

A basic configuration of a rotary electric machine in a second embodiment is the same as that of the first embodiment, and only a configuration of a shielding member 60A is different from that of the first embodiment.

Therefore, components identical with or similar to those in the first embodiment are given the same reference numerals, and structures and features thereof will not be described in order to avoid redundant explanation.

Figure 11A:
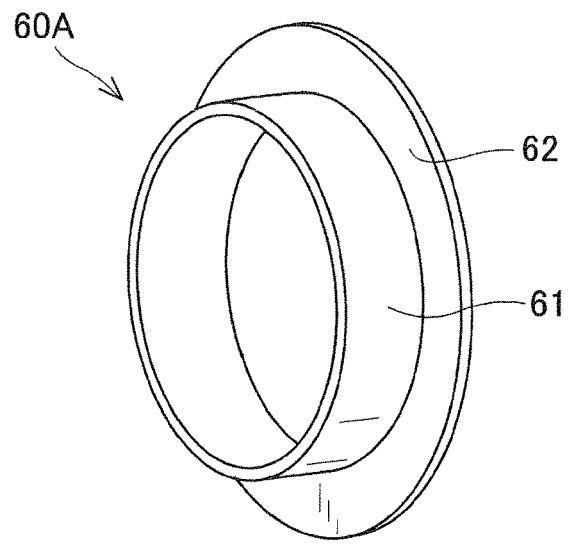
FIG. 11A shows a perspective view of a shielding member used in a second embodiment.

As shown in FIG. 11A, the shielding member 60A of the second embodiment is composed of an annular body portion 61 with a substantially constant thickness, and a ring-plate-like flange portion 62 spreading outwardly in a radial direction from an outer end in an axial direction of the main body portion 61.

In this case, an outer diameter D1 of the main body portion 61 is configured to be larger than the inner diameter D2 of the first and the second coil-end groups 47 and 48 of the stator winding 40.

Further, an outer diameter of the flange portion 62 is configured substantially equal to an outer diameter of the first and the second coil-end groups 47 and 48.

Figure 11B:
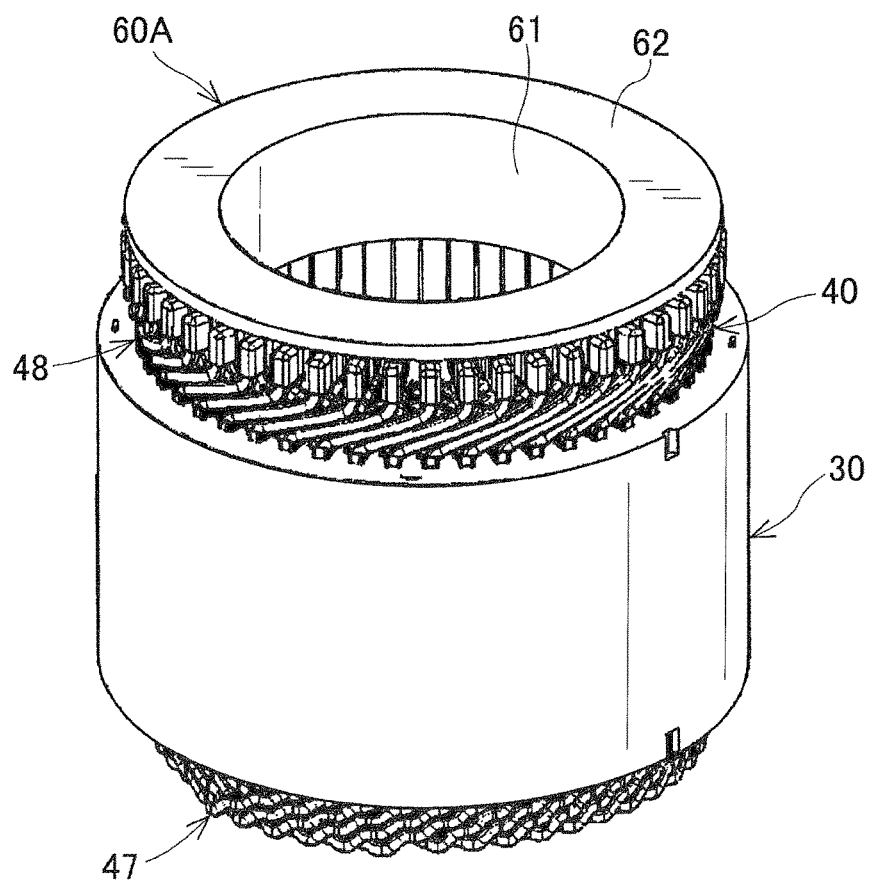
FIG. 11B shows a perspective view of a state of the shielding member used in the second embodiment attached to the coil-end group.

As shown in FIG. 11B, the shielding member 60A is attached by press-fitting the main body portion 61 into the inner circumferential surfaces of the first and the second coil-end groups 47 and 48 of the stator winding 40.

Then, as in the first embodiment, in order to prevent the press-fitted shielding member 60A from detaching from the first and the second coil-end groups 47 and 48, the shielding member 60A is adhered to the first and the second coil-end groups 47 and 48 by using the adhesive agent such as varnish, for example.

The shield member 60A is attached to a state where the flange portion 62 comes into contact with respective axial end surface of the first and the second coil-end groups 47 and 48.

In addition, the shielding member 60A is also formed entirely by a resin material having a similar coefficient of linear expansion between the insulating films of the conductor segments 50 that compose the stator winding 40.

In the rotary electric machine of the second embodiment configured as above, when the liquid coolant discharged from the discharge ports 15a and 16a is supplied by the coolant supply system from above to the tops of the first and the second coil-end groups 47 and 48, the supplied liquid coolant enters into insides of the first and the second coil-end groups 47 and 48 and flows downwardly.

Then, when the liquid coolant reaches the inner circumferential surfaces of the first and the second coil-end groups 47 and 48, the fall into the inner circumferential side of the first and the second coil-end groups 47 and 48 is blocked by the main body portion 61 of the shield member 60A.

Further, the fall to outside in the axial direction of the first and the second coil-end groups 47 and 48 is prevented by the flange portion 62 of the shield member 60A.

Thus, the liquid coolant flows downwardly guided by the flange portion 62 and the main body portion 61 of the shield member 60A, and drops to the outside from the lower ends of the outer circumferential surfaces of the first and the second 10 coil-end groups 47 and 48.

Therefore, even in the second embodiment, the whole first and second coil-end groups 47 and 48 are cooled efficiently and reliably by the liquid coolant that flows evenly inside the entire second coil-end groups 47 and 48, thus sufficient cooling effect is obtained.

As described above, even in the rotary electric machine of the second embodiment, the stator 20 has the shielding member 60A disposed along the inner circumferential surfaces of the first and the second coil-end groups 47 and 48 of the stator winding 40.

As a result, it is possible to achieve the same effect as the first embodiment such as to cool throughout the first and the second coil-end groups 47 and 48 efficiently and reliably by the liquid coolant, thus a sufficient cooling effect can be obtained.

In particular, the shielding member 60A of the second embodiment has the ring-plate-like flange portion 62 spreading outwardly in the radial direction from the outer end in the axial direction of the main body portion 61.

As a result, it is possible to prevent the liquid coolant supplied to the first and the second coil-end groups 47 and 48 from falling outside in the axial direction, and more cooling effect can be obtained.

Third Embodiment

A basic configuration of a rotary electric machine in a third embodiment is the same as that of the first embodiment, and only a configuration of a shielding member 60B is different from that of the first embodiment.

Therefore, components identical with or similar to those in the first embodiment are given the same reference numerals, and structures and features thereof will not be described in order to avoid redundant explanation.

Figure 12A:
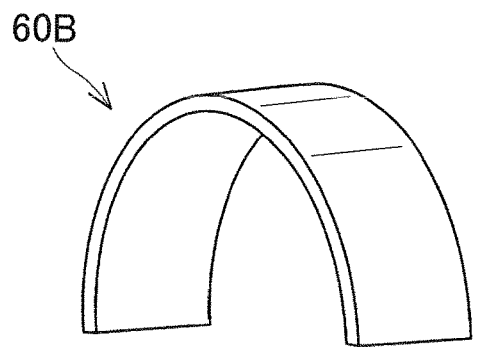
FIG. 12A shows a perspective view of a shielding member used in a third embodiment.

As shown in FIG. 12A, the shielding member 60B of the third embodiment is shaped in a semicircular arc (approximately 180 degrees) with a substantially constant thickness.

The shielding member 60B is also formed entirely by a resin material having a similar coefficient of linear expansion to the insulating films of the conductor segments 50 that compose the stator winding 40.

Figure 12B:
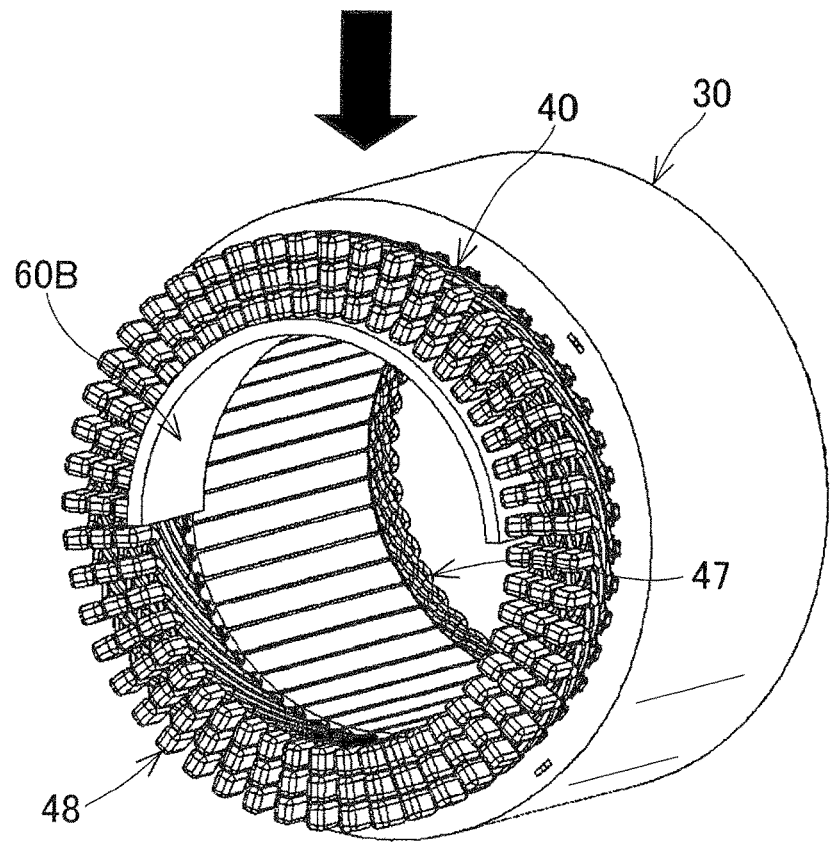
FIG. 12B shows a perspective view of a state of the shielding member used in the third embodiment attached to the coil-end group.

As shown in FIG. 12B, the shielding member 60B is adhered by adhesive agent such as varnish, for example, so that an outer circumferential surface of the shielding member 60B contacts with the inner circumferential surfaces of the first and the second coil-end groups 47 and 48.

The shielding member 60B is attached so that a central portion in a circumferential direction thereof is positioned facing a dropping direction of the liquid coolant (upward) in the present embodiment.

In the rotary electric machine of the third embodiment configured as above, when the liquid coolant discharged from the discharge ports 15a and 16a is supplied by the coolant supply system from above to the tops of the first and the second coil-end groups 47 and 48, the supplied liquid coolant enters into insides of the first and the second coil-end groups 47 and 48 and flows downwardly as in the case of the first embodiment.

Then, even in the case of the third embodiment, since the fall of the liquid coolant into the inner circumferential side of the first and the second coil-end groups 47 and 48 is blocked by the shielding member 60B and distributed on both sides in the circumferential direction, the liquid coolant flows evenly inside the entire first and second coil-end groups 47 and 48.

Thus, the whole first and second coil-end groups 47 and 48 are cooled efficiently and reliably by the liquid coolant, and sufficient cooling effect is obtained.

As described above, even in the rotary electric machine of the third embodiment, the stator 20 has the shielding member 60B disposed along the inner circumferential surfaces of the first and the second coil-end groups 47 and 48 of the stator winding 40.

As a result, it is possible to achieve the same effect as the first embodiment such as to cool throughout the first and the second coil-end groups 47 and 48 efficiently and reliably by the liquid coolant, thus a sufficient cooling effect can be obtained.

In particular, since the shielding member 60B of the third embodiment is shaped in the semicircular arc, substantially equal cooling effect compared to the annular member of the first embodiment can be obtained, and downsizing and price reduction are enabled.

Other Embodiments

The present disclosure is not limited to the above embodiments, but it may be variously modified within the scope of the present disclosure.

Figure 13:
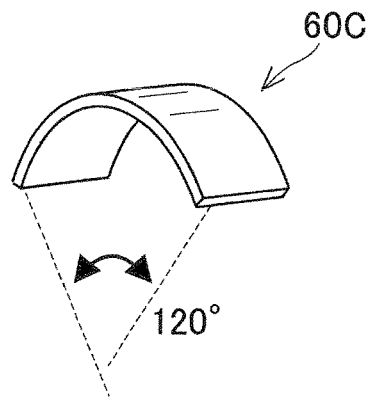
FIG. 13 shows a perspective view of a shielding member in a first modification.

For example, although the shielding member 60B is shaped in the semicircular arc (approximately 180 degrees) in the third embodiment described above, as a shielding member 60C of a first modification shown in FIG. 13, it may be shaped in a semicircular arc of approximately 120 degrees, and may be further downsized.

Further, although the shielding members 60, 60A, and 60B in the first to third embodiments described above are made of the resin material having the similar linear expansion coefficient between the insulating films of the conductor segments 50 that compose the stator winding 40, at least surface portions of outer peripheral sides thereof may be formed of the resin material of the similar linear expansion coefficient to the insulating film of the conductor segments 50.

Figure 14:
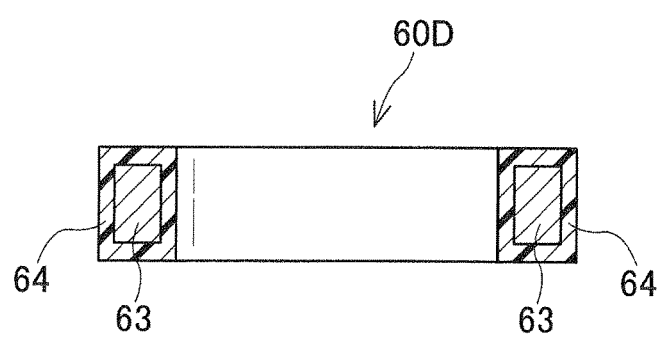
FIG. 14 shows a cross-sectional view of a shielding member in a second modification.

For example, a shield member 60D of a second modification shown in FIG. 14 is formed in an arc or annular shape, and is composed by a non-resin portion 63, for example made of non-plastic materials such as metal, which is located in a cross-sectional center, and a resin portion 64 made of a resin material that covers an outer circumferential surface of the non-resin portion 63.

Figure 15:
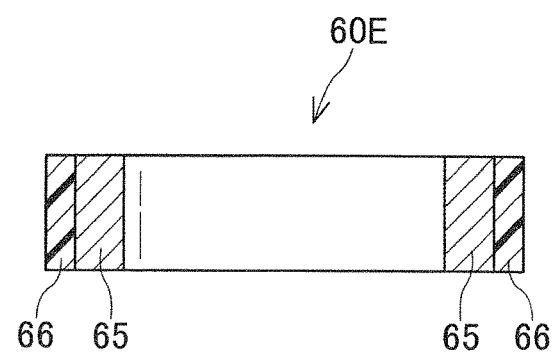
FIG. 15 shows a cross-sectional view of a shielding member in a third modification.

In addition, a shielding member 60E of a third modification shown in FIG. 15, and is composed by a non-resin portion 65, for example made of non-plastic materials such as metal, disposed on an inner circumferential side, and a resin portion 66 made of a resin material disposed on an outer peripheral side of the non-resin portion 65.

Here, although the first to third embodiments described above are the examples of applying the rotary electric machine according to the present disclosure to the motor (electric motor), the present disclosure can also be applied for a generator, a motor, or a rotary electric machine that can used the both selectively as a rotating electric machine installed in the vehicle.

What is claimed is:

1. A rotating electric machine for a vehicle, the rotating electric machine comprising:
    a rotor;
    a stator disposed facing the rotor in a radial direction having a stator core with a plurality of slots aligned in a circumferential direction and a stator winding comprising a plurality of conductor segments welded together and wound around the slots of the stator core; and
    a cooling mechanism for cooling a plurality of coil-end groups of the stator winding by dropping a liquid coolant from an outer peripheral side thereof; wherein,
    the coil-end groups include a first coil-end group with a plurality of turn portions of the conductor segments stacked in a radial direction of the stator core and disposed in one axial end of the stator winding, and include a second coil-end group with a plurality of welded joint portions stacked in the radial direction of the stator core and disposed in another axial end of the stator winding;
    four or a greater even number of the conductor segments are accommodated in each slot of the stator in a row in the radial direction, turn portions of the conductor segments electrically connect an Nth layer of one slot of the stator and an N+1 th layer of another slot that is separated from the one slot of the stator, and the conductor segments are disposed such that the turn portions in even numbered layers and odd numbered layers in each of the slots are inclined in opposite circumferential directions to each other and open end portions of the conductor segments are formed to be twisted by a half pole pitch in a circumferential direction on an outside of the stator core in an axial direction of the stator core;
    the plurality of conductor segments that are in the first coil-end group are in contact with each other in a circumferentially adjacent manner;
    the stator has a shielding member configured to prevent the liquid coolant from falling into the inner circumferential side of one of the coil-end groups, the shielding member being disposed only along an inner circumferential surface of the one of the coil-end groups;
    the shielding member is formed in an annular shape;
    the shielding member is formed of a resin material of a similar linear expansion coefficient to an insulating film of the conductor segments;
    an outer diameter of the shielding member is larger than an inner diameter of the one of the coil-end groups;
    the shielding member is attached to an inner peripheral side of the one of the coil-end groups by press-fitting; and
    the inner peripheral side of the one of the coil-end groups is pressed radially outward by the shielding member, which reduces clearances inside the coil-end groups.

2. The rotating electric machine according to claim 1, wherein,
    the shielding member is adhered to the one of the coil-end groups using an adhesive agent.

3. The rotating electric machine according to claim 1, wherein,
    the shielding member is formed in a semicircular arc, and is attached to the one of the coil-end groups so that a central portion in a circumferential direction thereof is positioned where the liquid coolant is dropped.

4. The rotating electric machine according to claim 1, wherein,
    the stator winding has a straight portion extending in the axial direction accommodated in the slots of the stator core, and the straight portion is projected by a predetermined length from an end surface of the stator core.

5. A rotating electric machine for a vehicle, the rotating electric machine comprising:
    a rotor;
    a stator disposed facing the rotor in a radial direction having a stator core with a plurality of slots aligned in a circumferential direction and a stator winding comprising a plurality of conductor segments welded together and wound around the slots of the stator core; and a cooling mechanism for cooling a plurality of coil-end groups of the stator winding by dropping a liquid coolant from an outer peripheral side thereof; wherein, the coil-end groups include a first coil-end group with a plurality of turn portions of the conductor segments stacked in a radial direction of the stator core and disposed in one axial end of the stator winding, and include a second coil-end group with a plurality of welded joint portions stacked in the radial direction of the stator core and disposed in another axial end of the stator winding;

four or a greater even number of the conductor segments are accommodated in each slot of the stator in a row in the radial direction, turn portions of the conductor segments electrically connect an Nth layer of one slot of the stator and an N+1 th layer of another slot that is separated from the one slot of the stator, and the conductor segments are disposed such that the turn portions in even numbered layers and odd numbered layers in each of the slots are inclined in opposite circumferential directions to each other and open end portions of the conductor segments are formed to be twisted by a half pole pitch in a circumferential direction on an outside of the stator core in an axial direction of the stator core;

the plurality of conductor segments that are in the first coil-end group are formed in a stepped-shape and are in contact with each other in a circumferentially adjacent manner;

the stator has a shielding member configured to prevent the liquid coolant from falling into an inner circumferential side of the second coil-end group, the shielding member being disposed only along an inner circumferential surface of the second coil-end group among the coil-end groups;

the shielding member is formed in an annular shape;

the shielding member has a flange portion spreading outwardly in a radial direction from an outer end in an axial direction of the shielding member such that the shielding member covers the inner circumferential side of the second coil-end group and the axial end of the second coil-end group but does not cover an outer circumferential side of the second coil-end group, and an outer diameter of the flange portion is equal to or larger than an outer diameter of the second coil-end group;

the shielding member is formed of a resin material of a similar linear expansion coefficient to an insulating film of the conductor segments;

an outer diameter of the shielding member is larger than an inner diameter of the second coil-end group;

the shielding member is attached to an inner peripheral side of the second coil-end group by press-fitting; and the inner peripheral side of the second coil-end group is pressed radially outward by the shielding member, which reduces clearances inside the coil-end groups.

* * * * *